(12) United States Patent
Tanaka et al.

(10) Patent No.: US 8,316,984 B2
(45) Date of Patent: Nov. 27, 2012

(54) ELECTRIC POWER STEERING APPARATUS

(75) Inventors: Masayuki Tanaka, Yamatotakada (JP);
Naoaki Oikawa, Atsugi (JP); Yuuichi Fukuyama, Yokohama (JP); Yuji Takatsuka, Kobe (JP); Takahiro Kuroiwa, Tokyo (JP)

(73) Assignees: JTEKT Corporation, Osaka (JP);
Mitsubishi Electric Corporation, Tokyo (JP); Nissan Motor Co. Ltd, Yokohama (JP)

( * ) Notice: Subject to any disclaimer, the term of this patent is extended or adjusted under 35 U.S.C. 154(b) by 99 days.

(21) Appl. No.: 13/061,638

(22) PCT Filed: Sep. 28, 2009

(86) PCT No.: PCT/JP2009/066790
§ 371 (c)(1),
(2), (4) Date: Mar. 1, 2011

(87) PCT Pub. No.: WO2010/038702
PCT Pub. Date: Apr. 8, 2010

(65) Prior Publication Data
US 2011/0203869 A1    Aug. 25, 2011

(30) Foreign Application Priority Data
Oct. 1, 2008 (JP) ................. 2008-256176

(51) Int. Cl.
*B62D 5/04* (2006.01)
(52) U.S. Cl. .......... 180/443; 180/444; 180/446; 701/41; 701/42; 701/43
(58) Field of Classification Search ........... 180/443, 180/444, 446
See application file for complete search history.

(56) References Cited

U.S. PATENT DOCUMENTS

| | | | | |
|---|---|---|---|---|
| 6,973,992 B2* | 12/2005 | Yoneda et al. | ................. | 180/446 |
| 2002/0057015 A1 | 5/2002 | Kikuta et al. | | |
| 2008/0067960 A1* | 3/2008 | Maeda et al. | ............ | 318/400.02 |
| 2008/0211441 A1* | 9/2008 | Nagase | .......................... | 318/440 |
| 2010/0263960 A1* | 10/2010 | Nagase | .......................... | 180/443 |
| 2010/0294586 A1* | 11/2010 | Nagase et al. | ................. | 180/446 |
| 2012/0145473 A1* | 6/2012 | Suzuki | .......................... | 180/446 |

FOREIGN PATENT DOCUMENTS

JP    A-7-33033    2/1995
(Continued)

OTHER PUBLICATIONS

Jun. 13, 2012 Extended European Search Report issued in European Patent Application No. 09817735.5.
International Search Report mailed Dec. 8, 2009 issued in International Patent Application No. PCT/JP2009/066790 (with translation).

*Primary Examiner* — Lesley D Morris
*Assistant Examiner* — Marlon Arce
(74) *Attorney, Agent, or Firm* — Oliff & Berridge, PLC

(57) ABSTRACT

In an electric power steering apparatus including a capacitor for smoothing out the voltage of a battery and a relay including a relay contact disposed at a place upstream of the capacitor, a path is provided for directly conducting a terminal voltage of the capacitor from a downstream side of the relay contact to a system power supply that generates a source voltage for a control system including a controller and the like, so that the system power supply and the control system that is supplied therefrom with electric power for control purpose are utilized as a discharge circuit. Thus is obtained a simplified configuration of circuit responsible for discharging the capacitor.

2 Claims, 1 Drawing Sheet

FOREIGN PATENT DOCUMENTS

| JP | A-11-240454 | 9/1999 |
| JP | B2-3511593 | 1/2004 |
| JP | A-2005-261054 | 9/2005 |
| JP | A-2006-341793 | 12/2006 |

* cited by examiner

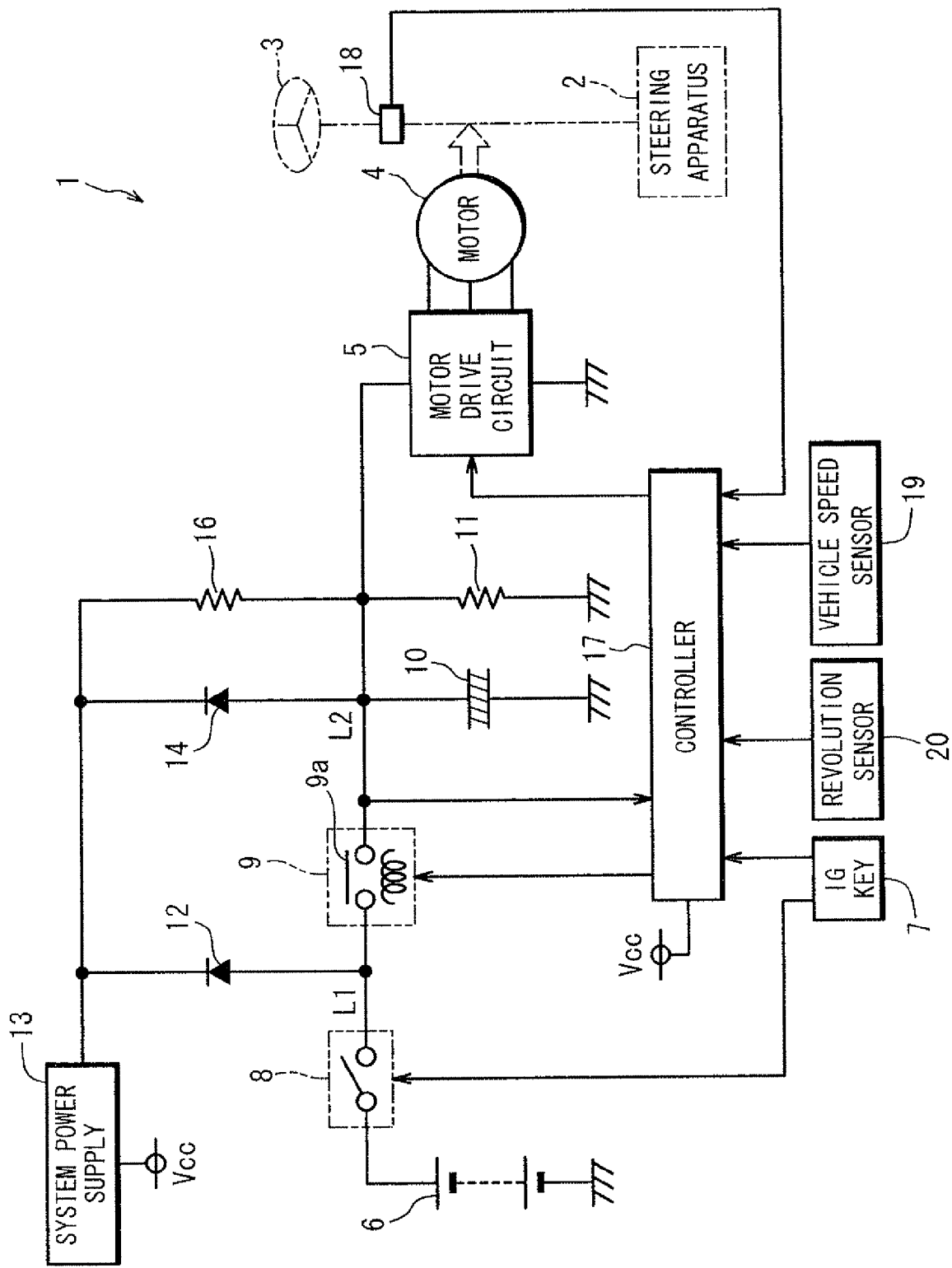

US 8,316,984 B2

ELECTRIC POWER STEERING APPARATUS

TECHNICAL FIELD

The present invention relates to an electric power steering apparatus for generating a steering assist force through a motor powered by a battery.

BACKGROUND ART

An electric power steering apparatus is an apparatus that assists in steering by driving the motor thereof to generate a steering assist force according to a steering torque. An ECU (Electronic Control Unit) equipped with a microcomputer carries out controls required for providing the steering assist. It is necessary from the viewpoint of failsafe to provide a means for deactivating the motor in the event of failure of the microcomputer. In this connection, a relay contact is interposed in an electrical path conducting electric power from the battery to the motor. The relay contact is adapted not to be closed if a failure of the microcomputer is detected by an initial checkup performed at the time of vehicle startup. If no failure is detected by the initial checkup, the relay contact is closed to enable the operation of the electric power steering apparatus.

The above-described relay contact becomes unable to fulfill the failsafe function if the contact in closed state is fused. It is therefore necessary to check for fused contact each time the apparatus is started. Specifically, the checkup is performed immediately after turning on the ignition key and before exciting the relay by determining whether a voltage equal to or more than a predetermined value is present in an electrical path downstream of the relay contact. Such a voltage should not be detected if the relay contact is not fused and is in normal condition. Conversely if the relay contact is fused, a battery voltage of the predetermined value or more is detected.

On the other hand, the ECU contains a component interfering with the above-described fusion checkup. This component is a capacitor disposed on the downstream side of the relay contact in order to smooth out fine ripples of the battery voltage. While the electric power steering apparatus is operating, electric charge is naturally accumulated in the capacitor. In a case where the ignition key is turned on again immediately after the turn-off operation thereof, for example, the terminal voltage of the capacitor on the downstream side of the relay contact is not yet fully lowered (not completely discharged). As a result, the detected voltage may be falsely recognized as failure although the relay contact is not actually fused. In this connection, there has been proposed an electric power steering apparatus provided with a discharge circuit dedicated to forcibly discharging the capacitor after the turn-off operation of the ignition key (see for example, Patent Document 1).

However, the provision of the dedicated discharge circuit leads to the increase in the number of components. Accordingly, the electric power steering apparatus becomes more susceptible to failure and is also increased in manufacture cost.

CITATION LIST

Patent Document

Patent Document 1: Japanese Patent NO. 3511593 (FIG. 1)

DISCLOSURE OF THE INVENTION

In view of the foregoing problem in the background art, the invention seeks to provide an electric power steering apparatus featuring a simplified configuration of circuit responsible for discharging the capacitor.

According to an aspect of the present invention, an electric power steering apparatus for generating a steering assist force through a motor powered by a battery comprises: (a) a capacitor connected to an electrical path conducting electric power from the battery to the motor and operative to smooth out voltage of the battery; (b) a relay including a relay contact interposed in the electrical path at a place upstream of the capacitor; (c) a controller that controls the motor and that determines, before exciting the relay, whether the relay contact is fused or not by comparing a voltage of a downstream side of the relay contact with a threshold value; (d) a system power supply for generating a source voltage for a control system including the controller and supplying electric power to the control system; and (e) a path extending from the downstream side of the relay contact to the system power supply for directly inputting a terminal voltage of the capacitor to the system power supply.

In the electric power steering apparatus having the above-described arrangement, the path for directly inputting the terminal voltage of the capacitor to the system power supply is provided thereby permitting the system power supply and the control system that is supplied therefrom with electric power for control purpose to be utilized as the discharge circuit. Therefore, the capacitor can be quickly discharged without a dedicated discharge circuit. That is, the configuration of the circuit responsible for discharging the capacitor can be simplified. As a result, there is no fear of making a false detection of a fused relay contact even if the ignition key is turned on again immediately after the turn-off operation thereof.

In the above electric power steering apparatus, it is preferred that a terminal voltage of the capacitor at which the controller is turned off is set at a lower value than the threshold value in a state where the system power supply generates the source voltage of the control system based on the terminal voltage of the capacitor.

In the above case, when the controller that is a component of the control system turns off, it is ensured that the terminal voltage of the capacitor has fallen below the threshold value. In other words, there can be eliminated an undesirable situation where the terminal voltage of the capacitor stays above the threshold value despite the turn-off of the controller.

BRIEF DESCRIPTION OF THE DRAWING

FIG. 1 is a circuit diagram principally showing an electric circuit of a general arrangement of an electric power steering apparatus according to one embodiment of the present invention.

MODE FOR CARRYING OUT THE INVENTION

FIG. 1 is a circuit diagram principally showing an electric circuit of a general arrangement of an electric power steering apparatus 1 according to one embodiment of the Invention. Referring to the FIGURE, a steering apparatus 2 is driven by a steering torque applied to a steering wheel 3 by a driver and a steering assist force generated by a motor 4. The motor 4 is a 3-phase brushless motor that is driven by a motor drive circuit 5 incorporating an inverter. The motor drive circuit 5 is supplied with voltage from a battery 6.

The voltage of the battery 6 is conducted to the motor drive circuit 5 and the motor 4 via an IG contact 8 that closes in response to a turn-on operation of an ignition key 7 and a relay contact 9a of a relay 9 for failsafe purpose. A capacitor 10 for smoothing out fine ripples of the voltage of the battery 6 and a resistor 11 are connected to an electrical path L2 on a downstream side of the relay contact 9a. Although the resistor 11 is connected in parallel with the capacitor 10, the resistor 11 has such a high resistance value that it functions poorly as a discharging resistor.

An anode of a diode 12 is connected to an electrical path L1 on an upstream side of the relay contact 9a. A cathode of the diode 12 is connected to a system power supply 13. The diode 12 is provided for preventing reverse current flow when the battery 6 is mistakenly connected in reverse. The system power supply 13 converts (steps down) the voltage of the battery 6 to a source voltage Vcc of the control system, that is lower than the battery voltage, and then supplies the resultant voltage to the entire apparatus.

An anode of another diode 14 is connected to an ungrounded terminal of the capacitor 10. A cathode of this diode 14 is connected to the system power supply 13. The diode 14 is provided for discharging the capacitor 10, forming a conduction path extending from the downstream side of the relay contact 9a to the system power supply 13 for directly inputting a terminal voltage of the capacitor 10 to the system power supply 13. This conduction path conducts the voltage in the forward direction.

Further, there is formed a circuit that extends from the electrical path L1 to the electrical path L2 via the diode 12 and a resistor 16 for precharging the capacitor 10. The motor drive circuit 5 and the relay 9 are controlled by a controller 17 including a microcomputer. Inputted to an input port (including an A/D conversion port) of the controller 17 are an output signal from a torque sensor 18 to detect a steering torque, an output signal from a vehicle speed sensor 19 to detect a vehicle speed, an output signal from a revolution sensor 20 to detect engine revolutions, an operation signal of the ignition key 7 and a voltage signal of the electrical path L2 on the downstream side of the relay contact 9a. The source voltage Vcc for operating the controller 17 is supplied from the system power supply 13.

The electric power steering apparatus 1 of the above-described arrangement operates as follows. When the ignition key 7 in an off state is turned on, the IG contact 8 is closed so as to supply the voltage of the battery 6 to the system power supply 13 via the diode 12. Thus is supplied the source voltage of control system Vcc. In conjunction with an engine start-up operation, the revolution sensor 20 inputs to the controller 17 the output signal indicating the engine startup. In response to the inputted signal, the controller 17 starts an initial checkup.

In this initial checkup, the controller 17 performs self-checking and also checks for the fusion of the relay contact 9a by checking up on the voltage on the downstream side of the relay contact 9a (voltage on the electrical path L2). At this point of time, the relay 9 is unexcited and hence, the relay contact 9a is open if it is normal.

A voltage over a predetermined threshold value detected on the downstream side of the relay contact 9a suggests the possibility of fused contact and hence, the controller 17 does not excite the relay 9. Accordingly, the electric power steering apparatus 1 is unable to provide steering assist. In a case where a failure is detected as a result of self-checking by the controller 17, the electric power steering apparatus is also unable to provide steering assist.

On the other hand, the voltage from the battery 6 is conducted through the diode 12 by closing the IG contact 8 and divided between the resistors 16 and 11 so that the capacitor 10 is precharged at the resultant divided voltage. The capacitor 10 is precharged to prevent inrush current from being drawn into the capacitor 10 when the relay contact 9a is initially turned on.

If the voltage on the downstream side of the relay contact 9a is at a lower value than the threshold value, the controller 17 excites the relay 9 after a certain period of time from the turn-on operation of the ignition key 7. Consequently, the relay contact 9a is closed so as to apply the voltage of the battery 6 to the motor drive circuit 5. This enables the electric power steering apparatus 1 to provide steering assist afterward. When the driver turns the steering wheel 3, the steering torque is detected by the torque sensor 18, which sends an output signal to the controller 17. The controller 17 calculates a required steering assist force based on the steering torque and the vehicle speed and controls the motor drive circuit 5 in a manner such that the required steering assist force is generated. When the motor drive circuit 5 operates, the electric power from the battery 6 is supplied to the motor 4.

On the other hand, when the driver stops the vehicle and turns off the ignition key 7, the IG contact 8 is opened and the relay 9 becomes de-excited to open the relay contact 9a. Thus is cut off the power supply from the battery 6 to the motor 4 and the power supply from the battery 6 to the system power supply 13. Accordingly, the potential of the system power supply 13 falls, so that the terminal voltage of the capacitor 10 causes a current flowing into the system power supply 13 via the diode 14. Consequently, the capacitor 10 is quickly discharged, so that the voltage on the downstream side of the relay contact 9a quickly falls below the above-described threshold value (in about 1.5 seconds from the turn-off operation, for example). It is noted that the controller 17 is turned off when the voltage supplied from the system power supply 13 falls below a predetermined voltage.

Specifically, the system power supply 13 transforms the voltage supplied from the capacitor 10 to the source voltage of control system Vcc as an output to the controller 17. However, if the voltage supplied from the capacitor 10 decreases, the system power supply 13 becomes unable to maintain the output voltage at the value of the source voltage Vcc, so that the output voltage falls below the source voltage Vcc. The controller 17 is turned off when the output voltage from the system power supply 13 lowers to or below the predetermined voltage. A transfer factor (step-down ratio) of the voltage of the system power supply 13 is defined such that a terminal voltage of the capacitor converted into an output voltage lower than the predetermined voltage is set at a lower value than the threshold value based on which the above-described relay fusion is determined. That is, it is ensured that the terminal voltage of the capacitor 10 surely takes a lower value than the threshold value when the controller 17 is turned off after the turn-off operation of the ignition key 7.

Therefore, even if the ignition key 7 is turned on again shortly after the turn-off operation thereof, the voltage on the downstream side of the relay contact 9a is determined by the initial checkup to be lower than the threshold value. Hence, the controller 17 is prevented from falsely recognizing a fused relay contact 9a from the terminal voltage of the capacitor 10.

Namely, when the controller 17 that is a component of the control system turns off, it is ensured that the terminal voltage of the capacitor 10 has fallen below the threshold value. In other words, there can be eliminated an undesirable situation where the terminal voltage of the capacitor 10 stays above the threshold value despite the turn-off of the controller 17. This obviates any potential false detection in the next round of initial checkup and ensures reliable detection of fusion of the relay contact 9a.

As described above, the diode 14 conducting the terminal voltage of the capacitor 10 directly to the system power supply 13 is provided thereby permitting the system power supply 13 and the control system that is supplied therefrom with power for control purpose to be utilized as the discharge circuit. This means the need for providing a dedicated discharge circuit is negated and the discharge of the capacitor 10 is enabled by merely providing the discharging diode 14. Thus is provided the electric power steering apparatus featuring the simplified configuration of the circuit responsible for discharging the capacitor.

The invention claimed is:

1. An electric power steering apparatus for generating a steering assist force through a motor powered by a battery, comprising:

a capacitor connected to an electrical path conducting electric power from the battery to the motor and operative to smooth out voltage of the battery;

a relay including a relay contact interposed in the electrical path at a place upstream of the capacitor;

a controller that controls the motor and that determines, before exciting the relay, whether the relay contact is fused or not by comparing a voltage of a downstream side of the relay contact with a threshold value;

a system power supply for generating a source voltage for a control system including the controller and supplying electric power to the control system; and a path extending from the downstream side of the relay contact to the system power supply for directly inputting a terminal voltage of the capacitor to the system power supply.

2. The electric power steering apparatus according to claim 1, wherein, in a state where the system power supply generates the source voltage of the control system based on the terminal voltage of the capacitor, a terminal voltage of the capacitor at which the controller turns off is set at a lower value than the threshold value.

* * * * *